United States Patent [19]
Tesauro et al.

[11] Patent Number: 5,829,780
[45] Date of Patent: Nov. 3, 1998

[54] AIR BAG AND INFLATOR ASSEMBLY

[75] Inventors: Michael Tesauro, Wixom; John Schambre, Canton; Raymond Deyonker, Wixom; Karl M. Lindh, Canton, all of Mich.

[73] Assignee: Chrysler Corporation, Auburn Hills, Mich.

[21] Appl. No.: 726,714

[22] Filed: Oct. 7, 1996

[51] Int. Cl.⁶ .................................................. B60R 21/16
[52] U.S. Cl. ...................................... 280/731; 280/728.1
[58] Field of Search ................................ 280/731, 728.1, 280/728.2, 730.1, 730.2, 732, 733

[56] References Cited

U.S. PATENT DOCUMENTS

| 3,580,603 | 5/1971 | Chute | 280/731 |
|---|---|---|---|
| 3,680,884 | 8/1972 | Stephenson | 280/731 |
| 3,801,123 | 4/1974 | Jira | 280/731 |
| 3,837,669 | 9/1974 | Nagazumi et al. | 280/731 |
| 5,152,358 | 10/1992 | Kozuka | 280/731 |
| 5,398,963 | 3/1995 | Fohl | 280/731 |
| 5,482,315 | 1/1996 | Chandler, Jr. et al. | 280/731 |

FOREIGN PATENT DOCUMENTS 2137833  2/1972  Germany ................................ 280/731

*Primary Examiner*—Eric D. Culbreth
*Attorney, Agent, or Firm*—Lawrence J. Shurupoff

[57] ABSTRACT

An air bag and air bag inflator assembly for the steering column of an automotive vehicle. At the upper end of the steering column is a steering wheel shaft and a steering wheel. An air bag is enclosed within a housing mounted centrally on the steering wheel. An air bag inflator includes a canister which contains a gas-generating chemical and is mounted on the steering column. Gas generated in the canister is transmitted to the air bag through a flexible tube and a passage in the steering wheel shaft.

1 Claim, 2 Drawing Sheets

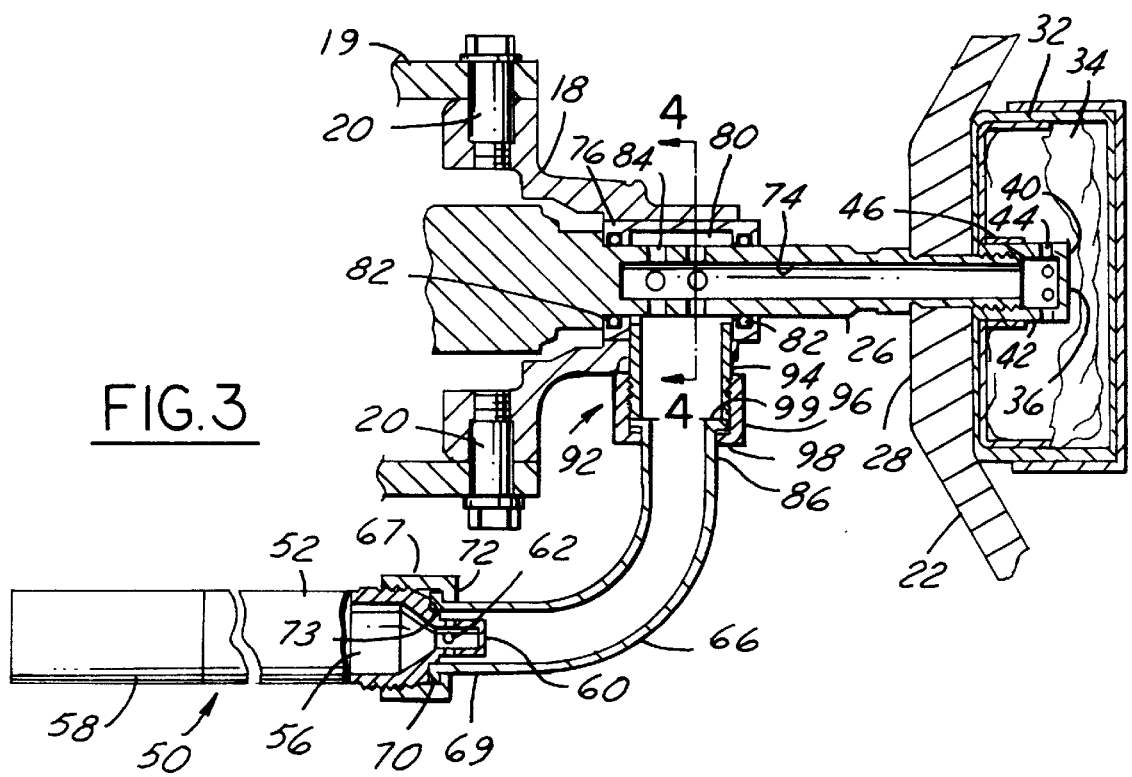
FIG.3
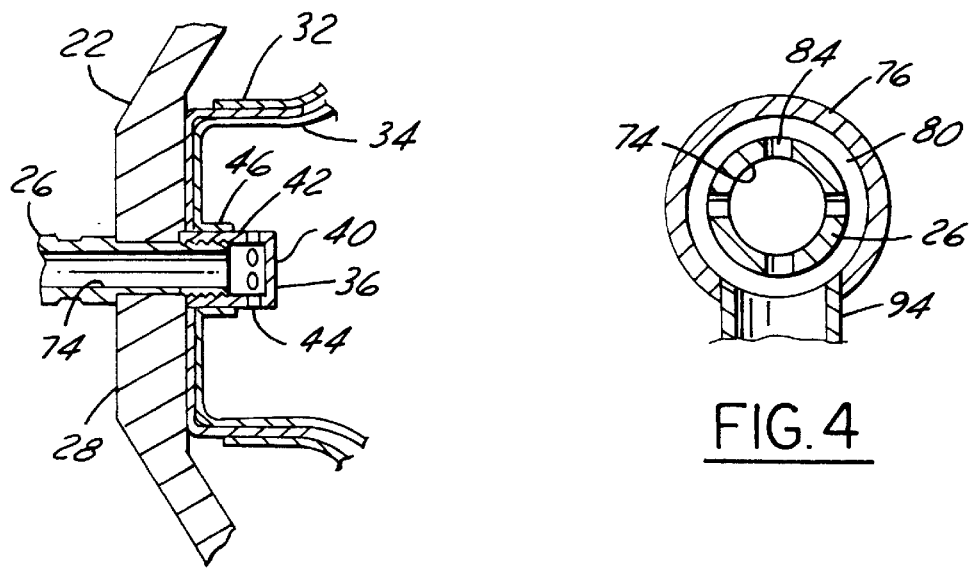
FIG.5
FIG.4

AIR BAG AND INFLATOR ASSEMBLY

FIELD OF THE INVENTION

This invention relates generally to air bags and more particularly to an air bag and inflator assembly for the steering column of an automotive vehicle.

BACKGROUND AND SUMMARY OF THE INVENTION

In a typical steering wheel air bag assembly, both the air bag and the air bag inflator are enclosed within a housing at the hub of the steering wheel. The presence of the inflator in the air bag housing increases both the weight and size of the housing.

In accordance with the present invention, only the air bag is enclosed within the housing at the hub of the steering wheel. The inflator is separated from the air bag housing and is secured to the steering column at a point beneath the steering wheel. Relocation of the inflator mass downward on the steering column improves steering column vibration Hertz numbers significantly. It also moves the hard points of the inflator away from the driver, thus reducing the chance of injury. Steering wheel hub size is reduced, allowing for additional steering wheel to hub crush zone, further reducing the chance of injury. The reduced steering wheel hub size also allows for increased performance of the air bag seat and overall occupant injury prevention. A reduced hub size has the further advantage of improving visibility of cluster gages and instrument panel switches. Relocating the inflator and positioning it apart from the air bag also discourages theft of the air bag module.

One object of this invention is to provide an air bag and inflator assembly having the foregoing features and capabilities.

Another object is to provide an air bag and inflator assembly which is composed of a relatively few simple parts, is rugged and durable in use, and is capable of being inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is a fragmentary view with parts in elevation and parts in section, showing the air bag in a housing at the hub of the steering wheel, the air bag inflator which is secured to the steering column at a point spaced downward from the steering wheel, and the flexible tube and steering wheel shaft passage for transmitting gas generated in the inflator to the air bag.

FIG. 4 is a sectional view taken on the line 4—4 in FIG. 3.

FIG. 5 is a sectional view of a portion of the structure shown in FIG. 3, showing the air bag after it has inflated and broken out of the housing.

DETAILED DESCRIPTION

Figure 1:
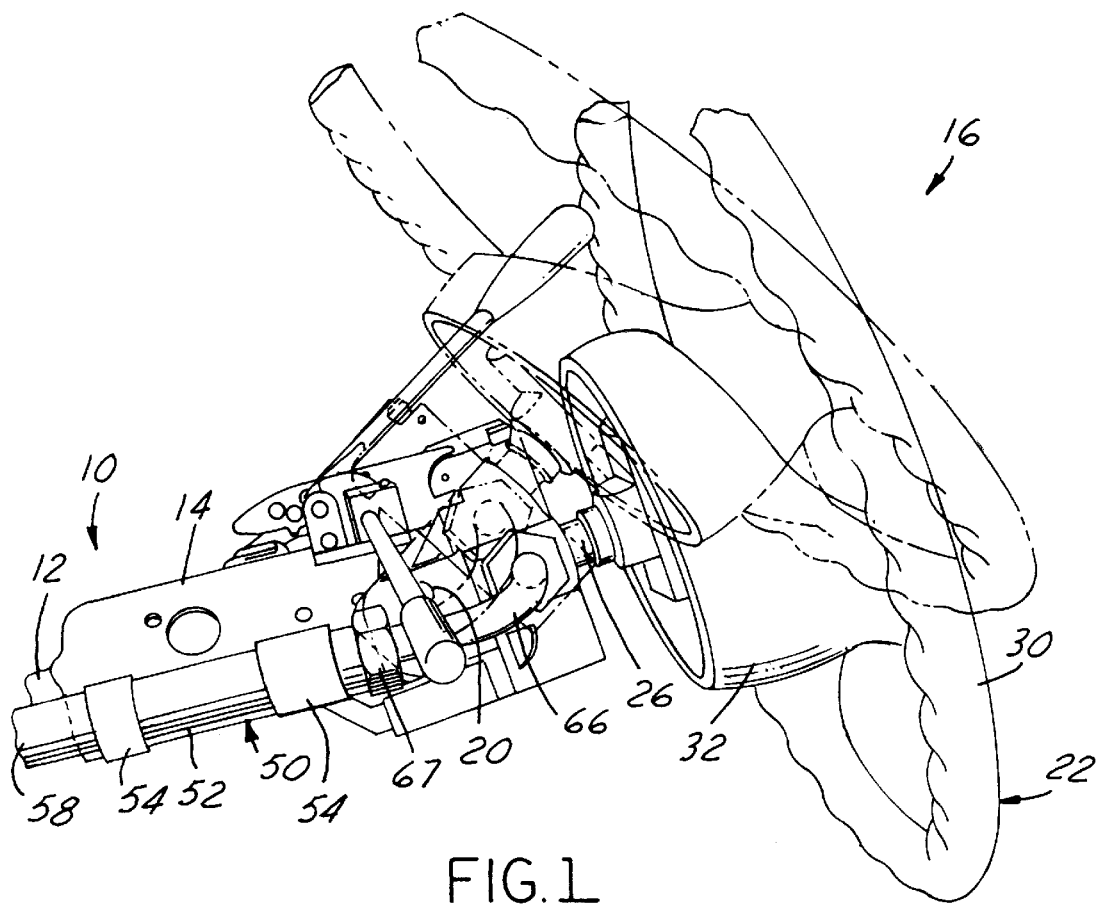
FIG. 1 is a perspective view of the upper end portion of the steering column of an automotive vehicle, in which the steering wheel is of the high pivot tilt type and is shown in two different positions, and having an air bag and inflator assembly constructed in accordance with the present invention. The support structure for the steering column is omitted for clarity, but is shown in FIG. 2.
Figure 2:
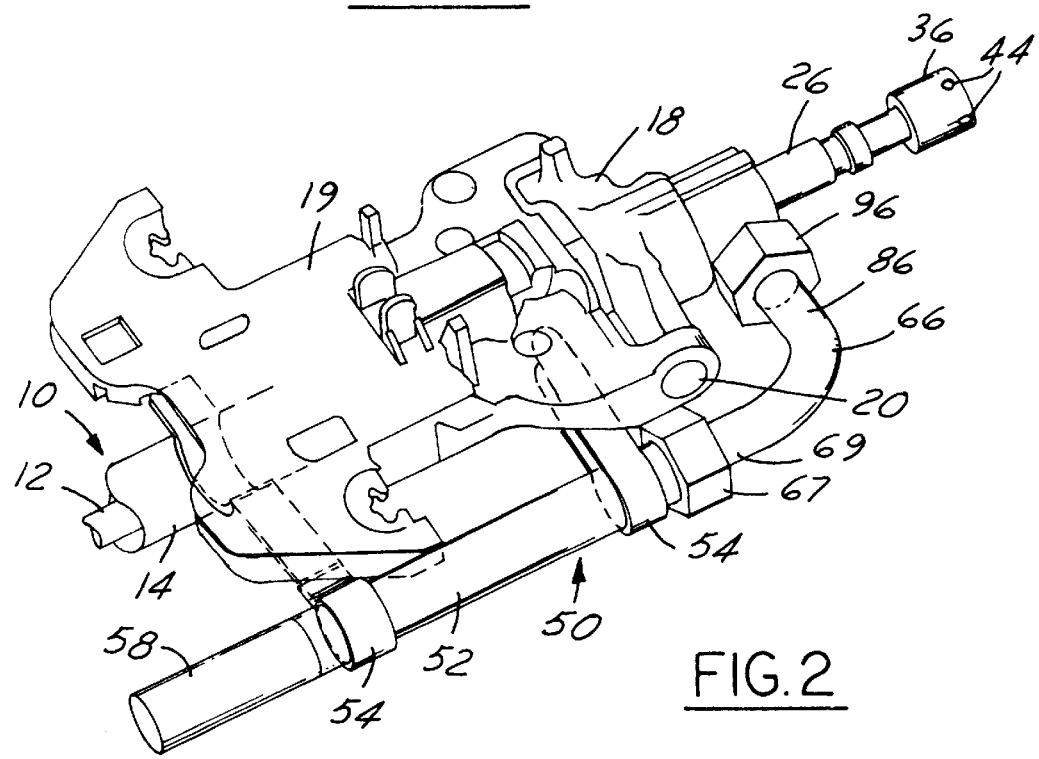
FIG. 2 is a fragmentary perspective view showing the inflator secured to the jacket of the steering column and also showing the flexible tube leading from the inflator to the steering wheel shaft.

Referring now more particularly to the drawings, an upwardly and rearwardly extending tubular steering column 10 of an automotive vehicle is shown, having an elongated steering shaft 12 extending within a jacket 14. The jacket 14 is secured to vehicle support structure by any suitable means, not shown. The lower end of the steering shaft 12 is connected by a coupler of known construction to a steering gear assembly (not shown) for steering the wheels of the vehicle.

A steering wheel assembly 16 at the upper end of the steering column is of the high pivot tilt type and has a mounting bracket 18. The mounting bracket is pivoted to support structure 19 by aligned, horizontal pivot pins 20 to permit up and down pivotal movement of the steering wheel assembly 16. The support structure 19 is rigidly secured to the frame of the vehicle by any suitable means, not shown.

The steering wheel assembly 16 has a steering wheel 22 provided with a steering wheel shaft 26 coupled to the steering shaft 12 by a coupler (not shown). It will be appreciated that the coupler is conventional and known in the art to allow the steering wheel shaft 26 to pivot or rotate relative to the steering shaft 12 so that the steering wheel 22 and the entire steering wheel assembly 16 may be tilted or adjusted up and down, as desired.

The steering wheel 22 has a central body portion 28 and a circular steering ring 30. Located centrally or at the hub of the steering wheel 22 and rigidly secured to the central body portion of the steering wheel is an air bag housing 32. A folded air bag 34 is stored in the housing 32.

The steering wheel shaft 26 extends through and is secured to the central portion 28 of the steering wheel and terminates in an end portion 36 inside the housing 32. As seen in FIGS. 3 and 5, the end portion 36 is a separate cup-shaped member threaded on the upper end of the steering wheel shaft which is closed by an end wall 40. The side wall 42 of the end portion 36 has ports 44. The air bag has a tubular opening 46 surrounding and secured in sealed relation to the side wall 42 beneath the ports 44, so that the ports are open to the inside of the air bag.

The air bag is inflated by an inflator 50 which comprises an elongated canister 52 secured to the jacket 14 by brackets 54. The canister has a chamber 56 containing an inert gas such as nitrogen, and includes an igniter 58 at one end. The opposite end of the canister tapers to a reduced nozzle 60 which is closed except for the ports 62 around the side wall thereof. The canister is spaced downwardly from the steering wheel assembly 16.

A flexible open-ended tube 66 of rubber or other suitable elastomeric material communicates with the canister through a fluid coupling in the form of a nut 67 at the end 69 of the tube. As shown, the tube end 69 fits over the nozzle and has an annular outwardly extending flange 70 engaged by an annular inwardly extending flange 72 on the nut 67. The nut threads on the side wall of the canister adjacent the nozzle to clamp and seal the flange 70 against a shoulder 73 of the canister and place the tube in communication with the chamber 56 of the canister through ports 62.

The steering wheel shaft 26 has an elongated central passage 74 extending to the end wall 40. To provide fluid communication between the tube 66 and the passage 74, the end of the passage opposite end wall 40 is encircled by a sleeve 76 secured to the bracket 18. The steering wheel shaft 26 can rotate in the sleeve. The sleeve 76 defines an annular chamber 80 around the steering wheel shaft 26, sealed at the ends by annular O-ring seals 82 between the sleeve and the steering wheel shaft 26. The chamber 80 communicates with the passage 74 through ports 84 in the steering wheel shaft.

The end 86 of the tube 66 communicates with the chamber 80 through a coupling 92 including an open-ended tubular inlet 94 and a nut 96. The tubular inlet 94 is secured to sleeve 76 and opens into chamber 80. The nut 96 threads on tubular inlet 94 and has an inwardly extending annular flange 98 clamping and sealing an outwardly extending annular flange 99 on the tube 66 against the end of tubular inlet 94.

The passage 74 in steering wheel shaft 26 communicates with the interior of the air bag 34 through ports 44.

When the air bag is to be deployed, as in the event of a frontal impact of sufficient magnitude, the igniter 58 is activated causing rapid expansion of gas in the canister 52. The gas is discharged into tube 66 through ports 62, from tube 66 into passage 74 through chamber 80 and ports 84, and from passage 74 into the air bag 34 through ports 44. This causes the air bag to deploy. The housing 32 for the air bag is constructed to break open under the force of the expanding air bag to permit full and complete air bag deployment, as seen in FIG. 5.

We claim:

1. An air bag and air bag inflator assembly for an automotive vehicle steering column including an elongated steering shaft that has an upper end on which a steering wheel is mounted and which extends lengthwise within an elongated jacket, comprising an air bag housing mounted centrally on the steering wheel, an air bag in said housing, an air bag inflator comprising a canister adapted to contain a gas-generating chemical and including an igniter, means mounting said canister in spaced relation to and on the exterior of the jacket in spaced relation to the steering wheel and the housing, and means for transmitting gas generated in said canister to said air bag to inflate the latter, said gas transmitting means comprising a flexible tube having first and second ends, a passage in the steering shaft terminating in the upper end thereof, means providing fluid communication between said first end of said tube and said canister, comprising a fluid coupling, said coupling comprising a nut sleeved on said first end of said tube and threaded on said canister, said canister having a nozzle projecting into said first end of said tube provided with ports opening into said first end of said tube, said nut having an annular flange clamping an annular flange on said first end of said tube against a shoulder on said canister, means providing fluid communication between the second end of said tube and said passage comprising a sleeve in which the steering shaft is rotatable forming an annular chamber around the steering shaft, fluid seals between said steering shaft and said sleeve to seal said chamber, a fluid coupling providing fluid communication between the second end of said tube and said chamber, ports in the steering shaft providing fluid communication between said chamber and said passage, the upper end of the steering shaft extending into the air bag, and means providing fluid communication between said passage and said air bag comprising ports in the upper end of the steering shaft.

\* \* \* \* \*